(12) United States Patent
Clarke (10) Patent No.: US 9,021,417 B2
(45) Date of Patent: Apr. 28, 2015

(54) GENERATING A SUBSET MODEL FROM A MODEL

(75) Inventor: Aidan Clarke, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1748 days.

(21) Appl. No.: 12/138,094

(22) Filed: Jun. 12, 2008

(65) Prior Publication Data

US 2009/0013305 A1 Jan. 8, 2009

(30) Foreign Application Priority Data

Jul. 6, 2007 (EP) ...................................... 07111933

(51) Int. Cl.
*G06F 9/44* (2006.01)

(52) U.S. Cl.
CPC ........................................ *G06F 8/10* (2013.01)

(58) Field of Classification Search
None
See application file for complete search history.

(56) References Cited

U.S. PATENT DOCUMENTS

| | | | |
|---|---|---|---|
| 6,029,169 A * | 2/2000 | Jenkins ................................. | 1/1 |
| 6,847,979 B2 | 1/2005 | Allemang et al. | |
| 6,922,692 B2 | 7/2005 | Clewis et al. | |
| 7,039,923 B2 * | 5/2006 | Kumar et al. ................. | 719/331 |
| 7,844,928 B2 * | 11/2010 | Bell et al. ....................... | 716/136 |
| 8,346,743 B2 * | 1/2013 | Pfuntner et al. ............... | 707/702 |
| 2003/0112958 A1 * | 6/2003 | Beaudoin et al. ......... | 379/221.15 |
| 2004/0205725 A1 * | 10/2004 | Lambert ........................ | 717/124 |
| 2005/0210133 A1 * | 9/2005 | Florissi et al. ................. | 709/224 |
| 2007/0100475 A1 * | 5/2007 | Korchinski ..................... | 700/28 |
| 2010/0011338 A1 * | 1/2010 | Lewis ............................ | 717/105 |
| 2012/0221314 A1 * | 8/2012 | Bourlatchkov et al. ......... | 703/21 |

FOREIGN PATENT DOCUMENTS

WO  WO 2005114590 A1 * 12/2005

* cited by examiner

*Primary Examiner* — Li B Zhen
*Assistant Examiner* — Evral Bodden
(74) *Attorney, Agent, or Firm* — Janaki K. Davda; Konrad, Raynes, Davda & Victor LLP (57) ABSTRACT

A technique for identifying a minimum number of model elements associated with a model for generating a subset model of the model that includes receiving a model, a set of model elements and a set of dependency types associated with the model; assigning a collector component to each of the received model elements; locating a model element dependent on the received model element by one of the received dependency types; receiving from each collector a dependent model element, and for each dependent model element, determining whether the dependent model element has been collected by another collector with the same dependency type and updating a subset model list with the collected dependent model element to build a list of collected dependent model elements for generating a subset model in response to a negative determination.

21 Claims, 8 Drawing Sheets

GENERATING A SUBSET MODEL FROM A MODEL

CROSS-REFERENCE TO RELATED FOREIGN APPLICATION

This application is a non-provisional application that claims priority benefits under Title 35, Unites States Code, Section 119(a)-(d) or Section 365(b) of United Kingdom Patent Application entitled "AN APPARATUS FOR GENERATING A SUBSET MODEL FROM A MODEL", having United Kingdom Patent Application Serial No. 07111933.3, filed on Jul. 6, 2007, by Aidan Clarke, which application is incorporated herein by reference in its entirety.

FIELD OF THE INVENTION

The invention relates to the field of software modelling tools. In particular the invention relates to generating a subset model from a model.

BACKGROUND OF THE INVENTION

A typical approach to software development involves the use of a modelling language to document the result of analysing a problem domain to define a set of requirements in order to design a solution.

For each aspect of the problem and solution, different modelling languages are used. The syntax of these modelling languages is defined in a meta-model. One such meta-model can be a meta-model which defines the manner in which business requirements are specified. Another meta-model may be one which defines the manner in which the data aspects of a problem domain are specified.

When designing a solution, using modelling techniques, a model driven approach results in the creation of numerous models having different meta-models. Within both of these types of models there are numerous model elements, with each model element having one or many relationships of different types with other model elements in the same or different models.

Although having many models allows a person to visualise many different aspects of a problem domain and at many different levels, the large number of models are very difficult to maintain. Thus, it is often necessary to partition the models so that the maintenance load can be spread among the members of a team.

There are many partitioning strategies which can be used to partition aspects of one or more models. Whichever strategy is used, semantic and syntactic consistency must be maintained.

A standard approach to analysing models treats the models as cyclic directed graphs where each model element is treated uniformly. Using this approach to define a subset of a model leads to a larger set of models than required. Further, current analytical strategies assume that any element within the model need not be visited more than once. This approach does not allow for the fact that a model element when visited later on in an analytical process may have semantics that require previously visited, but discarded, model elements. Thus the end result is that it is not possible to create a minimum subset of a large set of models that retains syntactic and semantic consistency based on a chosen set of elements.

SUMMARY OF THE INVENTION

Viewed from a first aspect, the present invention provides an apparatus for identifying a minimum number of model elements associated with a model for generating a subset model of the model, the apparatus comprising: a receiving component for receiving a model, a set of model elements and a set of dependency types associated with the model; a registry component for assigning a collector component to each of the received model elements; a collector for locating a model element dependent on the received model element by one of the received dependency types; a collator manager for receiving from each collector a dependent model element, and for each dependent model element, determining whether the dependent model element has been collected by another collector with the same dependency type; and said collator manager operable for updating a subset model list with the collected dependent model element to build a list of collected dependent model elements for generating a subset model in response to a negative determination.

Preferably, the present invention provides an apparatus wherein a collector component comprises a set of rules conforming to the syntax and semantic rules of a meta-model associated with the model.

Preferably, the present invention provides an apparatus wherein a collector component parses the model at a starting point of the received model element and traverses the assigned model element's immediate neighbourhood.

Preferably, the present invention provides an apparatus wherein the collator manager further comprises means for determining from the dependent model element and the received dependency type whether further dependent model elements are required to be located within the model.

Preferably, the present invention provides an apparatus wherein if the collator manager determines that further model elements require collection, the collator manager comprises means for assigning further collectors to collect further dependent model elements by a required dependency type.

Preferably, the present invention provides an apparatus wherein a dependency type is indicative of a relationship between a first model element and a second model element in the model.

Preferably, the present invention provides an apparatus wherein the registry component further comprises means for maintaining a set of registered collectors and each collector is associated with a type of model element and a type of dependency.

Preferably, the present invention provides an apparatus wherein the collator manager comprises means for optimising the subset list by parsing the list to locate any duplicate dependent model element by the required dependency type in order to produce an optimised list for generating a subset model.

Viewed from a second aspect, the present invention provides a method for identifying a minimum number of model elements associated with a model for generating a subset model of the model, the method comprising the steps of: receiving a model, a set of model elements and a set of dependency types associated with the model; assigning a collector component to each of the received model elements; locating a model element dependent on the received model element by one of the received dependency types; receiving from each collector a dependent model element, and for each dependent model element, determining whether the dependent model element has been collected by another collector with the same dependency type; and updating a subset model list with the collected dependent model element to build a list of collected dependent model elements for generating a subset model in response to a negative determination.

Viewed from a third aspect, the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which.

DETAILED DESCRIPTION OF THE INVENTION

In order to understand a preferred embodiment of the invention some background information is given on models and their elements. The term 'models' used throughout the specification is understood to comprise the terms 'data model', 'conceptual model', 'analytical model' etc.

Figure 1:
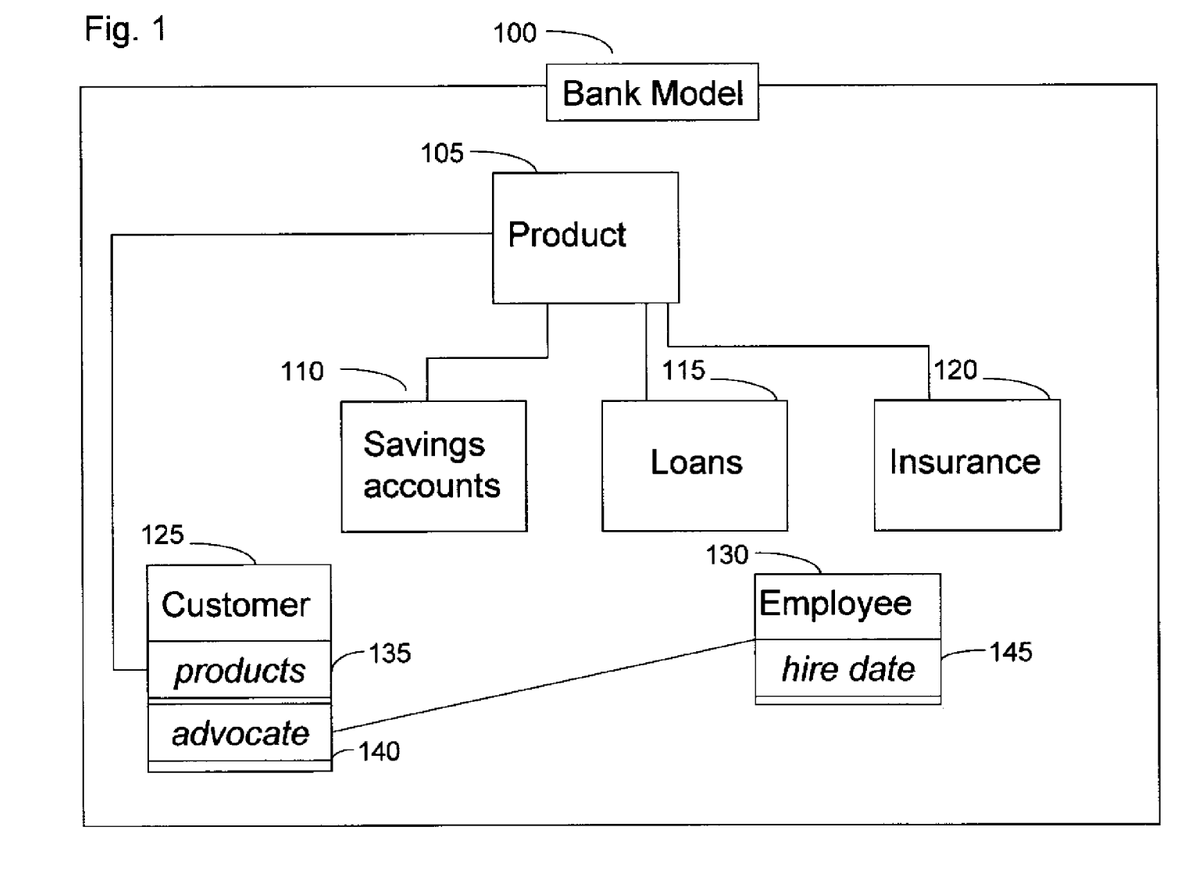
FIG. 1 is a block diagram of an example of a conceptual data model showing a number of model elements in accordance with the prior art.

FIG. 1, illustrates a conceptual data model 100. In this example, the model 100 relates to a bank and some of the bank's products, such as 'Savings accounts' 110, 'Loans' 115 and 'Insurance' 120. The model 100 also illustrates that a bank has a number of customers 125 who have products 135, and each customer 125 has a relationship with an employee 130. Each customer 125 may at any time have one or more products 135. Each customer 125 always has one employee 130 designated as their advocate 140 of the bank and each employee 130 was hired on a hire date 145. In the exemplary model 100, 'Customer' 125, 'Product' 105, 'Savings Account' 110, 'Loan' 115, 'Insurance' 120, and 'Employee' 130 are all entities. 'Hire date' 145, 'products' 135 and 'advocate' 140 are all attributes of an entity.

Figure 2:
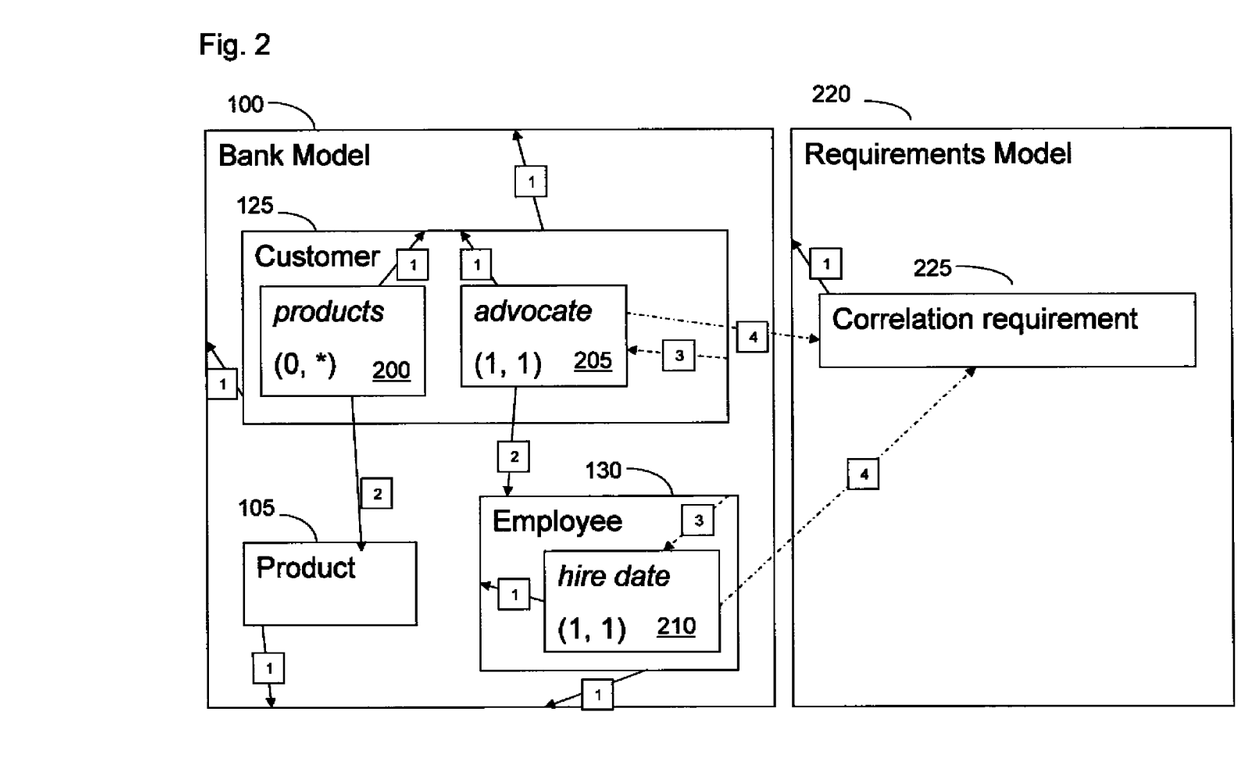
FIG. 2 is a block diagram of an example of a plurality of model elements contained within the conceptual data model of FIG. 2 in accordance with the prior art.

FIG. 2 shows a more detailed view of the bank model 100 of FIG. 1. The bank model 100 is associated with a requirements model 220. The 'Customer' entity 125 is shown having two attributes i.e. 'products' 200 and 'advocate' 205. These attributes 200, 205 are linked to entities 'Product' 105 and 'Employee' 130.

A line with a reference numeral '1' indicates that a) a dependency relationship between an entity or an attribute with another entity or an attribute, b) the dependency is defined by a meta-model and is required in order to maintain the syntax of the meta-model and c) there is a containment dependency, (for example, the entity 'Customer' 125 depends on the bank model 100 because a meta model states that entity 'Customer' 125 must be contained within the banking model 100 and not some other model).

Likewise the line represented by reference numeral '2' indicates a syntactical dependency, for example, the meta-model may have a rule which states that every attribute must have an attribute type and so on. Therefore, in this context attribute 'products' 200 has a syntactical dependency on 'Product' 105.

The line represent by a reference numeral '3' indicates a required containment dependency type. As shown in FIG. 2, attribute 'hire date' 145 is a required containment of entity 'employee'.

Lastly, a line represented by a reference numeral '4' indicates a mapping dependency from a model element in a first model to a model element in a second model. An example of this is shown in FIG. 2 where the attribute 'hire date' 210 is mapped to the business requirement i.e. the 'Correlation requirement' in the requirements model 220.

The bank model 100 also expresses a set of semantics. One semantic method for defining a semantic is to assign attributes 200, 205, 210 a 'cardinality' which states an upper and lower bound for instances of some model elements (attributes and entities etc). For example, every customer must have an employee to have as an advocate. In the example of FIG. 2, the entity 'Customer' 125 has as an advocate of 'one' employee (expressed as an advocate with a type 'Employee' 130) and an upper and lower bound of '1' (represented in FIG. 2 as (1,1)).

It can also be seen from FIG. 2 that the attribute 'advocate' 205 has a container dependency on 'Customer' 125 and a syntactic dependency on 'Employee' 130. The semantic expressed by the lower bound of '1' means that 'Customer' 125 has a dependency on 'advocate' 205 (a required containment). This is because the semantics of 'Customer' 125 state that each of its instances must have exactly one relationship with an instance of 'Employee' 130. Therefore, any model that attempts to express the idea of entity 'Customer' 125 must also express the idea of a relationship to an 'Employee' 130.

The requirements model 220 expresses requirements of, for example a business. Model elements of the model 100 that are required to support a specific requirement are mapped to the requirements in the requirements model 220.

For example, it may be a business requirement of a business to analyse the correlation between an employee's length of service and the number of customers for which that employee is an advocate. Thus, the requirements model 220 is assigned a model element called 'Correlation requirement' 225. The attributes in the bank model 100 which support this requirement, namely attribute 'advocate' 205 and attribute 'hire date' 210 are assigned a mapping element to the 'Correlation requirement' 210 (represented by the dotted line and the reference numeral 4).

Figure 3:
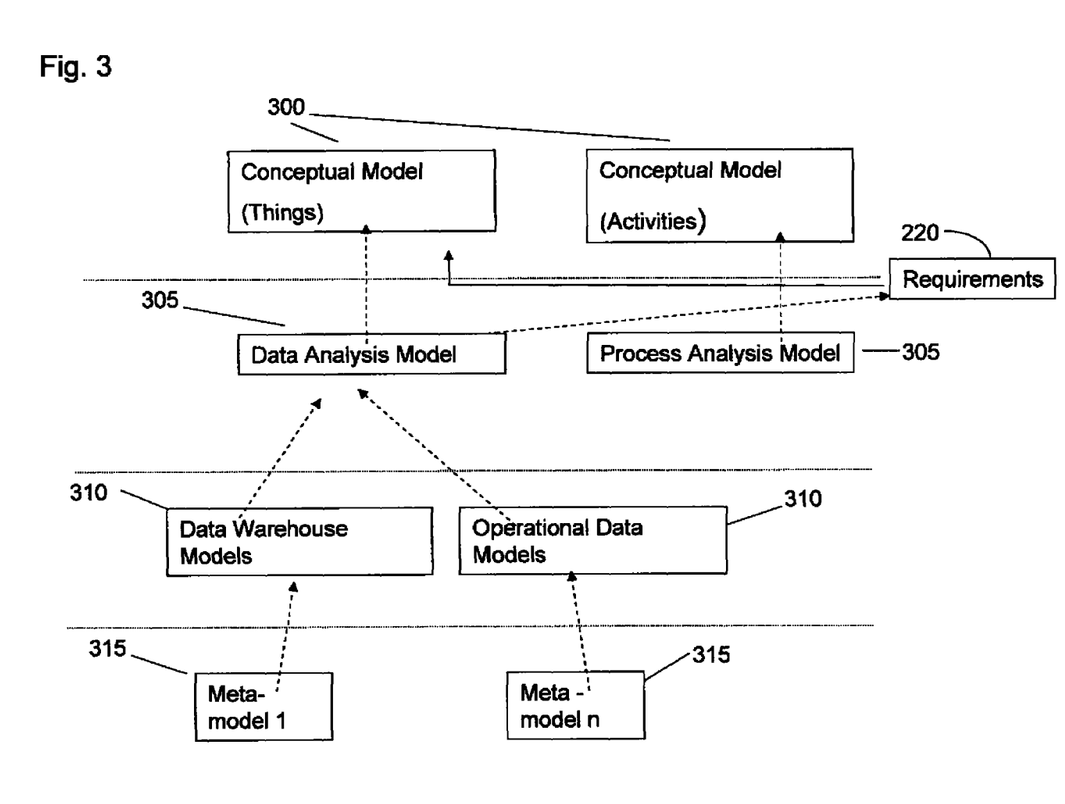
FIG. 3 is a block diagram of an example of a set of interconnected data models in accordance with the prior art.

FIG. 3 illustrates a plurality of data models 300, 305, 310, 315 which have been derived at different design levels of a solution and design phase of a project. Starting at the bottom of FIG. 3, there are two meta-models 315 associated with the solution physical layer, a data warehouse and operational meta-model 310 associated with the solution design phase, a data analysis and process analysis meta-model 305 associated with the analysis layer and lastly, two conceptual meta-models 300.

The top layer of FIG. 3 contains models that define the way a business interacts with the world. It covers the "things" the business deals with and defines them precisely: what they are, how they are described, how they relate to each other etc. It also covers the activities carried out by the business, what their goals are and which of the things in the world are affected by the activities (expressed by the solid arrow).

The analysis model layer contains models 305 that reflect an analysis of the manner in which the concepts defined at the upper level should be expressed in the relevant domain. For instance, the data analysis model 305 is a result of analysing the business concepts in a data concept. Model elements in this model are "mapped" (the dashed arrows) to the concept being expressed.

Each model, defined in a layer of FIG. 3 will have a set of requirements assigned to it modelled using a requirements meta-model a shown in the example of FIG. 2.

These requirements reflect a business need that must be expressed by each of the relevant models 300, 305, 310, 315. For instance, at the analysis level 305, the requirements might reflect a need to analyze a Financial Institution's Statement of Changes in Shareholders' Equity with regard to the United States Securities and Exchange Commissions (SEC) 10Q and 10K regulatory filing requirements. The result of analyzing many such requirements over time is a set of models that are extremely difficult for any user to understand or navigate. Further, when using the models to analyze or design there are numerous model elements that may not be relevant to that solution.

Thus according to a preferred embodiment of the present invention, a subset builder component is provided in which a subset model which maintains semantic and syntactic requirements from a set of defined requirements is derived from one or more interconnected models.

Figure 4:
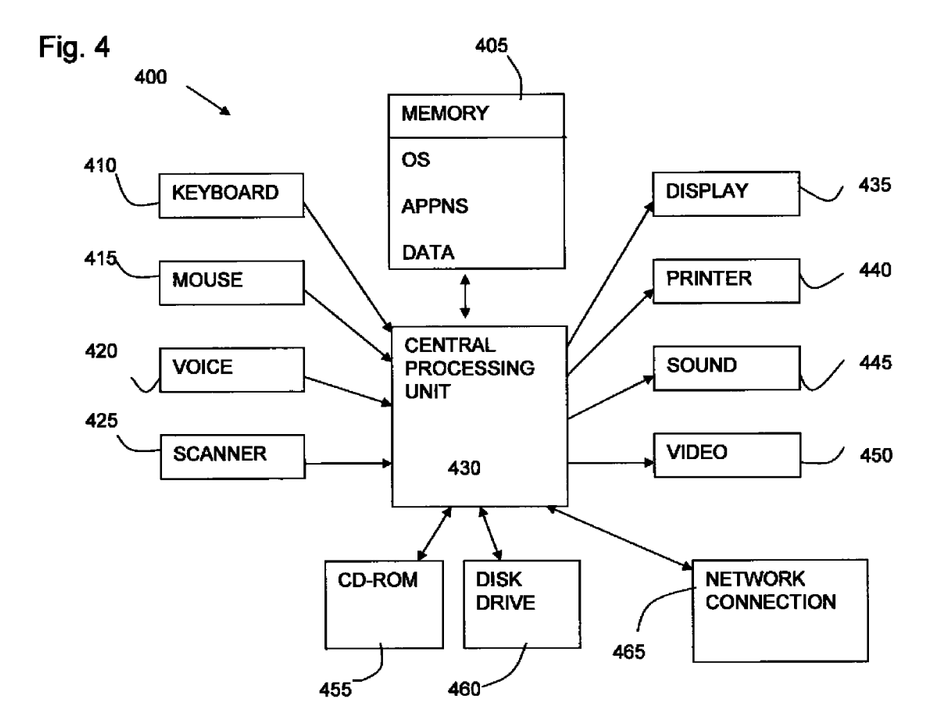
FIG. 4 is a block diagram of a data processing system in which the present invention may be embodied.

Moving onto FIG. 4 a computer system is shown in which the present invention may be implemented.

A computer system 400 has a central processing unit 430 with primary storage in the form of memory 405 (RAM and ROM). The memory 405 stores program information and data acted on or created by application programs. The program information includes the operating system code for the computer system 400 and application code for applications running on the computer system 400. Secondary storage includes optical disk storage 455 and magnetic disk storage 460. Data and program information can also be stored and accessed from the secondary storage.

The computer system 400 includes a network connection means 4655 for interfacing the computer system 400 to a network such as a local area network (LAN) or the Internet. The computer system 400 may also have other external source communication means such as a fax modem or telephone connection.

The central processing unit 430 comprises inputs in the form of, as examples, a keyboard 410, a mouse 415, voice input 420, and a scanner 425 for inputting text, images, graphics or the like. Outputs from the central processing unit 430 may include a display means 435, a printer 440, sound output 445, video output 450, etc.

In a distributed system, a computer system 400, as shown in FIG. 1, may be connected via the network connection 465 to a server (not shown) on which applications may be run remotely from the central processing unit 430.

Applications may run on the computer system 400 from a storage means 460 or via a network connection 465, which may include database applications etc. A user's computer system is not limited to any type of data processing system 400 or apparatus, and may be a conventional desktop or lap-top personal computer, a personal digital assistant or a mobile phone or any other specialized data processing device, which is capable of running a consumer application such as a text editor.

Figure 5:
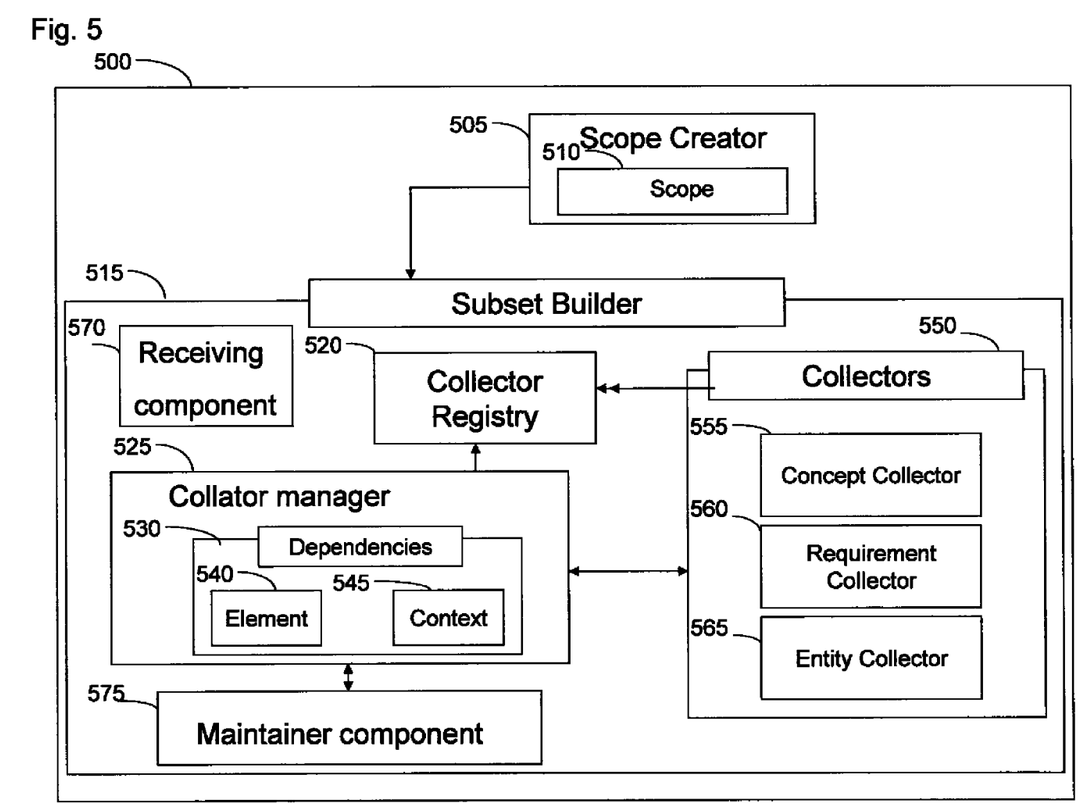
FIG. 5 is a block diagram detailing the subset builder component and its internal componentry in accordance with a preferred embodiment of the present invention.
Figure 6:
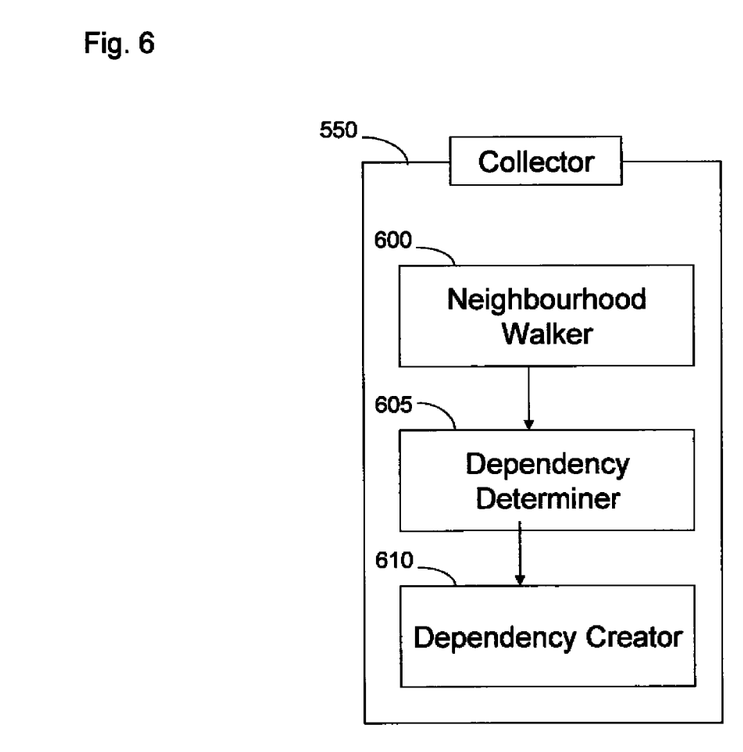
FIG. 6 is a block diagram detailing the internal components of a collector component in accordance with a preferred embodiment of the present invention.

With reference to FIGS. 5 and 6, the present invention provides a subset model creator component 500 comprising a scope creator 505 and a subset builder component 515. The subset model creator component 500 resides on a computer system 100 as an analysis tool for analysing a set of models against a set of defined requirements in order to create a sub model from one or more interconnected models.

With reference to FIG. 5 the components of the subset model creator component 500 are shown. The components comprise a scope creator 505 and a model subset builder 515. Each of these components interfaces and interacts with each other in order to provide the benefits of a preferred embodiment of the present invention.

The scope creator 505 defines an initial set of model elements for transmitting to the model subset builder 515. This initial set of model elements is the starting point from which the subset model is to be generated. A model element comprises an object as defined in a model, for example, a concept in a concept model, an entity or an attribute in a data model etc.

The scope creator 505 comprises an interface (not shown) in which one or more models 300, 305, 310, 315 and one or more model elements 125, 200, 205, 105, 130, 215, 205 associated with each of the models 300, 305, 310, 315 can be selected for analysis.

The selected models 300, 305, 310, 315 and selected model elements 200, 205, 105, 130, 210, 205 form a model element set which is used by the model subset builder 515 in order to identify a minimum number of dependent model elements 200, 205, 105, 130, 215, 205 for deriving a subset model.

For example, a subset model may be derived in order for a business to understand a business requirement which states that a bank needs to understand whether there is a correlation between the length of service of its employees and the likelihood that they act as customer advocates.

Thus, in the above example, the requirements model 220 would be assigned a model element that specifies the above requirement i.e. the 'Correlation requirement' 225, which is then mapped to and from the 'hire date' 215 and 'advocate' 205 attributes in the bank data model 100. Thus, the model element, 'Correlation requirement' 225 is selected via the interface component with the model elements 'hire date' 215 and 'advocate' 205.

Within each model 300, 305, 310, 315, model elements 200, 205, 105, 130, 210, 205 have relationships with other model elements, reflecting either a business semantic or a meta-model syntax. In general these relationships can be classified as one of the following dependency types:
Container
Required containment
Type
Required business semantic
Mapping to
Mapping from The scope creator 505 adds each of these dependency types to a scope package, when a model element 200, 205, 105, 130, 215, 205 is selected.

Thus, using the example above, if the 'correlation requirement' entity 225 is selected from the requirements model 220 the following model elements would be included in the scope package:
Correlation requirement (initial element)
Requirements Model (container)
hire date (mapping from)
Employee (container of hire date)
Bank Model (container of Employee and Customer)
advocate (mapping from)

Customer (container of advocate)

The model elements 200, 205, 105, 130, 215, 205, the set of dependencies and the models form a scope package for transmitting to the subset builder component 515 for analysis.

The subset builder component 515 comprises a receiving component 570 for receiving the scope package from the scope creator 505, a collection registry component 520 for holding a database of registered collector components and assigning a collector component to a model element 200, 205, 105, 130, 215, 205, a data store of different types of collector components 550, a maintainer component 575 for maintaining a record of collected elements 200, 205, 105, 130, 215, 205 and the context in which they were collected, a collator manager 525 for parsing a list of model elements from the scope package 510 received by the receiving component 570, retrieving a registered collection component 550 from the collection registry 520, receiving collection data from a collector and optimizing the data collected from each of the collectors in order to determine whether the model elements returned by each of the collectors, should in turn have a collection carried out and if so in what context.

Each of these components will be now explained in turn. The receiving component 570 as previously discussed receives a scope package 510 from the scope creator 505. The scope package 510 comprises the model element set 200, 205, 105, 130, 215, 205 and the context of these model elements i.e. a list of dependency types, to be used as the criterion for determining whether additional model elements 200, 205, 105, 130, 215, 205 are required.

The collector registry 520 maintains a list of collectors 550. Each collector is responsible for a different type of model element 200, 205, 105, 130, 215, 205. The collector registry 520, on receipt of a scope package extracts the model element set to determine which of the registered collectors 550 support a particular type of model element.

The collectors 550 are components which traverse a section of a model 300, 305, 310, 315, which a model element 200, 205, 105, 130, 215, 205 is associated, with immediate to the model 300, 305, 310, 315 element in a non-cyclic manner.

There are different types of collectors 550 for different types of model elements 200, 205, 105, 130, 215, 205. For example, some different types of collectors 550 are: an attribute collector 555 for collecting data pertaining to attributes, a relationship collector 560 for collecting data pertaining to a relationship between an entity or an attribute with other entities or attributes, and an entity collector 565 for collecting data pertaining to entities. Each type of collector 550 has inbuilt rules which understands the rules and syntax of a particular meta-model 300, 305, 310, 315. For example, referring back to FIG. 2, the model 100 comprises an entity named 'Customer' 125 and that entity contains an attribute named 'product' 105 and a required attribute named 'advocate' 205.

Thus an entity collector 565 will understand the meta-model which defines the semantics and syntax of the requirements of an attribute and an entity, i.e. that an entity may contain attributes, some of which are required by virtue of their cardinality. Also an attribute collector 565 will understand that an attribute must be contained in an entity and must have an associated entity type.

Each collector 550 is assigned a model element by the collector registry to collect and a context (dependency type) in which to collect the model element 200, 205, 105, 130, 215, 205. For example, referring to FIG. 2 a model element might be 'Customer' 125 and the context might be to include the dependency type "required containment". In this case, the collector 550 will return only the "advocate" attribute 205 because the solid line indicated by reference numeral 1 from attribute 'advocate' indicates a required containment.

With reference to FIG. 6, each collector 550 comprises a number of components, namely, a neighborhood walker component 600, a dependency determiner component 605 and a dependency creator component 610. The neighborhood walker component 600 determines which part of the one or more models the collector 550 must traverse in order to identify each dependency associated with a model element in order to determine each of the model elements associated with the model entity.

As the neighborhood walker 600 parses its immediate neighborhood, the dependency determiner 605 determines, for each model element 200, 205, 105, 130, 215, 205 that the neighborhood walker 600 traverses, whether the assigned model element 200, 205, 105, 130, 215, 205 is dependent on the traversed model element or not. If the traversed model element is a dependency with a valid dependency type, then the dependency creator 610 writes to a list the name of the assigned element and the name of the traversed element. The list is sent to the collator manager 525 for collating with other lists received from other collectors 550.

Using the previous example, where the context contains only the "required containment" dependency type, the neighborhood walker will discover the following:
"Bank Model", via a "container" dependency type,
"product", via an "optional containment" dependency type since its lower bound is "0"
"advocate", via a "required containment" dependency type since its lower bound is "1"

The dependency determiner 605 will examine each of these in turn, comparing them with the assigned context i.e. the context of a required containment. In this case, only 'advocate' 205 will be accepted since it is a 'required containment' whereas 'product' 105 is an optional containment.

With the list of accepted elements ("advocate", in this example), the dependency creator 605 prepares the result. The result from the collector 550 consists of two parts: a context within which further collection should occur and a list of collected model elements.

As each collector 550 understands a meta-model, the collector also specifies which dependency types are required when collecting its indirect dependencies. For example, a model element (a) directly depends on a set of model elements. Those model elements, in turn, depend on a further set of model elements. This latter set of model elements is "indirect dependants" of the initial element (a). The collector for the initial element must specify the context in which its indirect dependencies are collected.

In the example above, the context for the collection of the "customer" model element contained only the "required containment" dependency type. However, the collector 550, via a set of rules, understands that when collecting dependencies for 'advocate', the context must include "container" and "required semantic" in addition to its current context ("required containment").

Collectors 550 return a context that ensures that its dependants are properly collected. Each collector 550 knows that each dependent model element must have a container and that all required semantics must be included. It has no visibility of previous collections, and therefore of whether the elements it returns have been collected previously. In the event that they have been, the collator manager 525 will simply ignore these added dependency types.

The dependency creator 610, therefore, creates a context with the necessary dependency types and a list of the collected dependent model elements with their associated dependency type and transmits the results to the collator manager 525.

The collator manager 525 receives a list from each of the registered collector components 550. The collator manager 525 stores each of the lists in a data store. Taking each of the lists the collator manager 525 compares each of the collected dependent model elements with the list of elements defined in the scope 510 received from the receiving component 570. The collator manager 525, for the first list, writes to a further list each of the model elements which have been collected. For the next list, the collator manager 525 compares the collected dependent model elements listed as collected with the previous list and the list of selected elements defined in the scope 510. If the collator component 550 determines that a dependent model element has already been collected for the same context then this dependent model element is disregarded. The collator manager 525 performs this series of steps for each list received and updates a collator registry list with any new collected dependent model elements and dependency's it finds.

Conversely, the collator manager 525 ignores any model elements which have been collected before within the same context. Thus the collator manager 525, after processing each list, has an optimized list of model elements in which the subset model can be generated from.

Figure 7A:
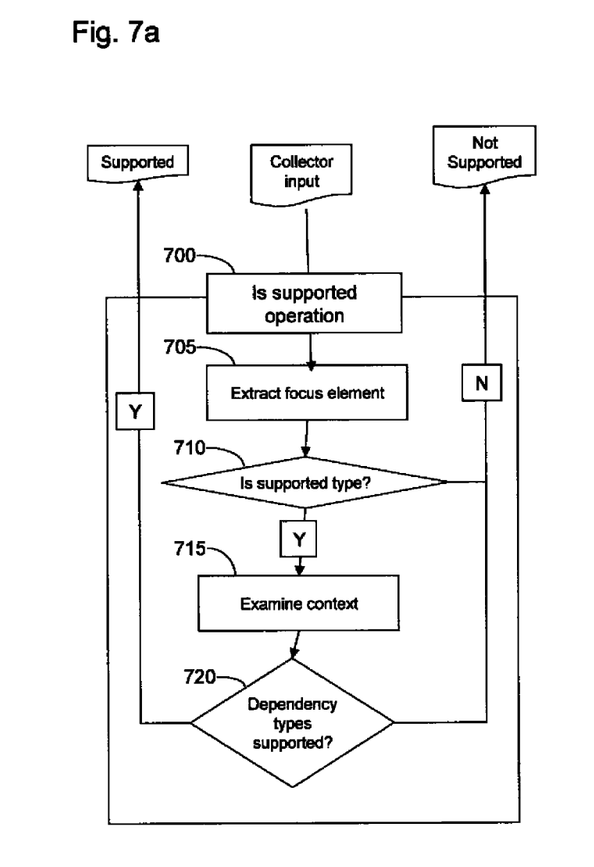
FIG. 7 is a flow chart showing the operational step of the collector components in accordance with a preferred embodiment of the present invention.
Figure 7B:
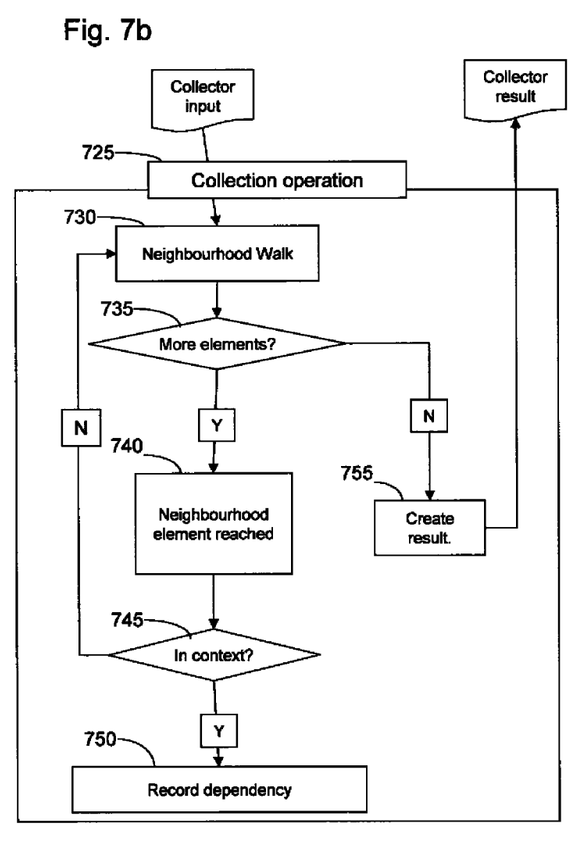

Moving onto FIGS. 7a and 7b the process steps of a collector component 550 are shown. A collector component 550 has two modes of operation, namely, support determination and dependency collection, shown in FIG. 7a and FIG. 7b respectively.

In the support determination mode of operation, the collector component 550 determines whether it can collect dependencies for a given model element in a given context. In the dependency collection mode of operation it collects dependencies for the given model element in the given context.

In the support determination model of operation, at step 700, the collector component receives a scope package 510 from the receiving component 570. The scope package 510 comprises the model element set containing a model element and a context in which a collection is to be requested. In step 705, the collector 550 extracts the model element from the scope package. At step 710, the collector 550 determines whether it can collect dependencies for the received model element's type. If the determination is negative the collector 550 transmits a message to the registry component 520 and the registry component 520 locates another collector 550.

If the determination is positive, the collector component 550 proceeds to step 715 where it examines context and then to step 720 where it determines whether it can collect dependencies for each of the dependency types listed in the context.

If the determination is negative it responds negatively to the collector registry component 520. If the determination is positive it responds to the requestor in the positive and begins its collection operation.

At step 725, a collector 550 receives an instruction to start a collection. The collector receives the model element to be located and the dependency type in which to collect further dependent model elements. The collector parses the model starting at the position of the received model element and walks around the model element's immediate neighborhood at step 730. A determination is made at step 735 as to whether there are any dependent model elements to collect. If the determination is negative no further action is taken at step 755.

If a positive determination the collector continues to parse the model at step 740 and the collector determines whether it can collect the dependent model elements within the context that it has been assigned i.e. is the dependent model element dependent on the received model element by the correct dependency type at step 745.

If the determination is positive the dependency is recorded in a dependency list at step 750. If the determination is negative control moves to step 730 and the collector 550 continues to parse the model looking for further valid dependencies.

Figure 8:
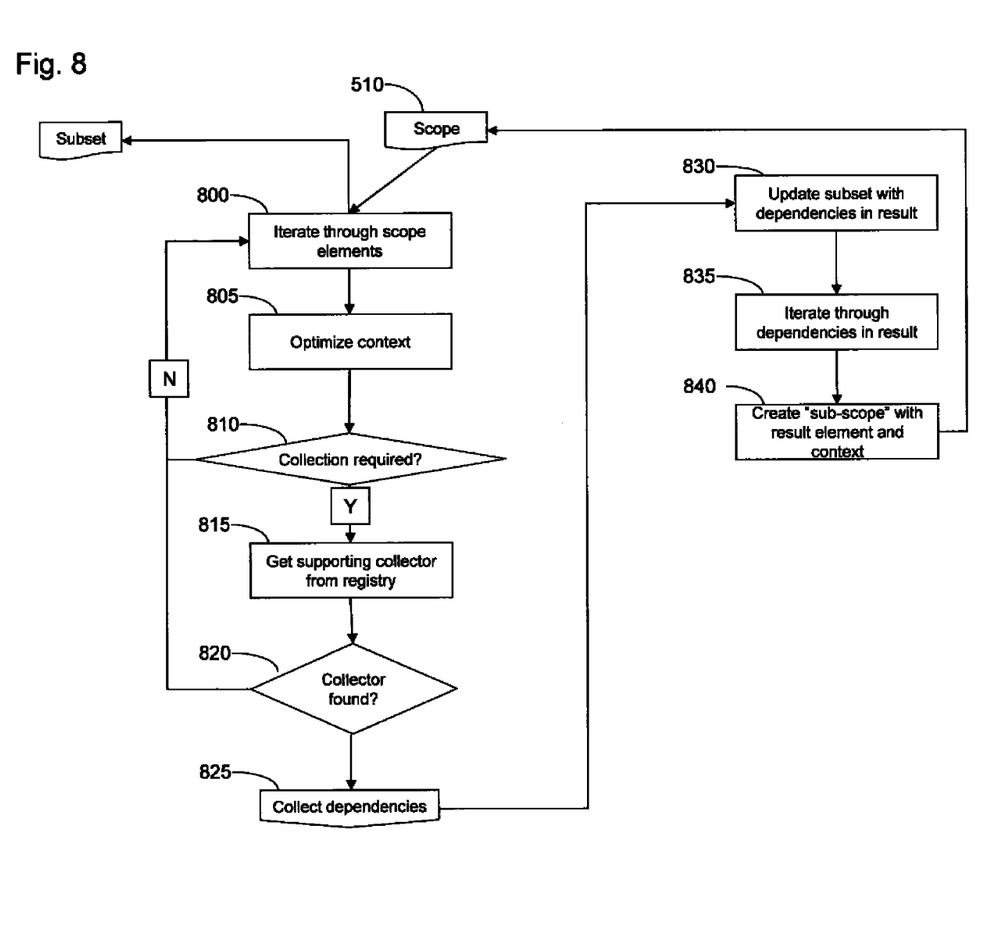
FIG. 8 is a flow chart showing the operational steps of the subset builder in accordance with a preferred embodiment of the present invention.

With reference to FIG. 8, the receiver component 570 receives a scope package 510 from the scope creator 505 and at step 800, the collector registry 520 iterates through each of the model elements within the received model element set. For each received model element it creates a collector scope package for communication with a collector. The collection scope package contains a copy of its received scope context and only that model element.

The collector scope package is then optimized at step 805. For each dependency type in the collection scope package context, a determination is made as to whether the model element has previously been collected for that dependency type. If the determination is positive, the dependency type is removed from the list.

At step 810, a determination is made as to whether a collection is required. If at the end of the optimization in step 805 there are no dependency types in the list, no collection is necessary and the iteration at step 800 continues and the subset builder continues its iteration through the list of model elements listed within the model element set and the list of dependencies with in the context.

If the determination is positive, control passes to step 815 and the registry collector 520 identifies in the registry a collector that is registered to collect a model element by iterating through the registered collectors and using each collector's support determination mode of operation (step 700 in FIG. 7a). In step 820, If a collector of the type required is not registered in the registry control passed back to step 800.

If a collector is located, control passes to step 825 and the collector 550 is requested to collect dependencies via its collection operation (step 725 in FIG. 7b). On return from the collection operation, control passes to step 830 with a list of identified dependencies and model elements, which updates a list of collected dependencies.

At step 835, the collator manager 525 receives the list of collected dependencies and iterates through the list looking for dependencies that have not already been collected in the same context. Then at step 840, for each model element in the list which has not already been identified, the collator manager 525 creates a new scope containing the model element and the context returned from the collector and recursively passes control to step 800 with the new scope.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, causes said computer system to perform all the steps of the method.

In a further alternative, the preferred embodiment of the present invention may be realized in the form of data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

The invention claimed is:

1. An apparatus for identifying a minimum number of model elements associated with a data model for generating a subset model of the data model, the apparatus comprising:
  a central processing unit; and
  a storage device coupled to the central processing unit, wherein the storage device stores computer program code, and wherein the processor is configured to execute the computer program code to perform operations, wherein the operations comprise:
  assigning a collector from a set of collectors to a model element from a set of model elements for the data model and a dependency type for the assigned model element from a set of dependency types that represent different types of relationships between the model elements, wherein each collector has a set of rules conforming to syntax and semantic rules of a meta-model associated with the assigned model element;
  traversing, with each of the collectors, an immediate neighbourhood of the assigned model element by:
    identifying an additional dependency type based on the assigned dependency type and the set of rules to identify a model element that is indirectly dependent on the assigned model element; and
    for each traversed model element,
      in response to determining that the traversed model element is directly dependent on the assigned model element based on the assigned dependency type, recording the traversed model element and the assigned dependency type; and
      in response to determining that the traversed model element is indirectly dependent on the assigned model element based on an identified, additional dependency type, recording the traversed model element and the identified, additional dependency type; and
  receiving from each of the collectors each recorded, traversed model element to form a subset model list for generating the subset model.

2. The apparatus as claimed in claim 1, wherein a collector from the collectors parses the data model at a starting point of the assigned model element.

3. The apparatus as claimed in claim 1, wherein the operations further comprise:
  determining from the dependent model element and the assigned dependency type whether further dependent model elements are required to be located within the data model.

4. The apparatus as claimed in claim 3, wherein the operations further comprise:
  in response to determining that further model elements require collection, assigning further collectors from the collectors to collect further dependent model elements by a dependency type.

5. The apparatus as claimed in claim 1, wherein the assigned dependency type is indicative of a relationship between a first model element and a second model element in the data model.

6. The apparatus as claimed in claim 1, wherein the operations further comprise:

maintaining a set of registered collectors, and wherein each of the registered collectors is associated with a type of model element and a dependency type.

7. The apparatus as claimed in claim 1, wherein the operations further comprise:
optimising the subset model list by parsing the subset model list to locate any duplicate dependent model elements by the recorded dependency type in order to produce an optimised list for generating the subset model.

8. A method for identifying a minimum number of model elements associated with a data model for generating a subset model of the data model, the method comprising:
assigning a collector from a set of collectors to a model element from a set of model elements for the data model and a dependency type for the assigned model element from a set of dependency types that represent different types of relationships between the model elements, wherein each collector has a set of rules conforming to syntax and semantic rules of a meta-model associated with the assigned model element;
traversing, with each of the collectors, an immediate neighbourhood of the assigned model element by:
identifying an additional dependency type based on the assigned dependency type and the set of rules to identify a model element that is indirectly dependent on the assigned model element; and
for each traversed model element,
in response to determining that the traversed model element is directly dependent on the assigned model element based on the assigned dependency type, recording the traversed model element and the assigned dependency type; and
in response to determining that the traversed model element is indirectly dependent on the assigned model element based on an identified, additional dependency type, recording the traversed model element and the identified, additional dependency type; and
receiving from each of the collectors each recorded, traversed model element to form a subset model list for generating the subset model.

9. The method as claimed in claim 8, wherein locating further comprises:
parsing the data model at a starting point of the assigned model element.

10. The method as claimed in claim 8, further comprising:
determining from the dependent model element and the assigned dependency type whether further dependent model elements are required to be located within the data model.

11. The method as claimed in claim 10, further comprising:
determining that further model elements require collection; and
receiving from each of the collectors a dependent model element assigning further collectors from the collectors to collect further dependent model elements by a dependency type.

12. The method as claimed in claim 8, wherein the assigned dependency type is indicative of a relationship between a first model element and a second model element in the data model.

13. The method as claimed in claim 8, further comprising:
maintaining a set of registered collectors, and wherein each of the registered collectors is associated with a type of model element and a dependency type.

14. The method as claimed in claim 8, further comprising:
optimising the subset model list by parsing the subset model list to locate any duplicate dependent model elements by the recorded dependency type in order to produce an optimised list for generating the subset model.

15. A computer program product comprising a non-transitory computer readable medium storing computer-readable instructions for identifying a minimum number of model elements associated with a data model for generating a subset model of the data model, wherein the computer-readable instructions, when executed on a processor of a digital computer, perform:
assigning a collector from a set of collectors to a model element from a set of model elements for the data model and a dependency type for the assigned model element from a set of dependency types that represent different types of relationships between the model elements, wherein each collector has a set of rules conforming to syntax and semantic rules of a meta-model associated with the assigned model element;
traversing, with each of the collectors, an immediate neighbourhood of the assigned model element by:
identifying an additional dependency type based on the assigned dependency type and the set of rules to identify a model element that is indirectly dependent on the assigned model element; and
for each traversed model element,
in response to determining that the traversed model element is directly dependent on the assigned model element based on the assigned dependency type, recording the traversed model element and the assigned dependency type; and
in response to determining that the traversed model element is indirectly dependent on the assigned model element based on an identified, additional dependency type, recording the traversed model element and the identified, additional dependency type; and
receiving from each of the collectors each recorded, traversed model element to form a subset model list for generating the subset model.

16. The computer program product as claimed in claim 15, comprising software code portions for performing:
parsing the data model at a starting point of the assigned model element.

17. The computer program product as claimed in claim 15, comprising software code portions for performing:
determining from the dependent model element and the assigned dependency type whether further dependent model elements are required to be located within the data model.

18. The computer program product as claimed in claim 17, comprising software code portions for performing:
determining that further model elements require collection; and
receiving from each of the collectors a dependent model element assigning further collectors from the collectors to collect further dependent model elements by a dependency type.

19. The computer program product as claimed in claim 15, wherein the assigned dependency type is indicative of a relationship between a first model element and a second model element in the data model.

20. The computer program product as claimed in claim 15, comprising software code portions for performing:
maintaining a set of registered collectors, and wherein each of the registered collectors is associated with a type of model element and a dependency type.

21. The computer program product as claimed in claim 15, comprising software code portions for performing:

optimising the subset model list by parsing the subset model list to locate any duplicate dependent model elements by the recorded dependency type in order to produce an optimised list for generating the subset model.

* * * * *